Jan. 27, 1953 M. J. MARRITS 2,626,479

TELEPHONE DESK SECRETARY

Filed March 23, 1948 2 SHEETS—SHEET 1

INVENTOR.
Murray J. Marrits
BY
Fraser, Myers & Manley
ATTORNEYS.

Jan. 27, 1953 | M. J. MARRITS | 2,626,479
TELEPHONE DESK SECRETARY
Filed March 23, 1948 | 2 SHEETS—SHEET 2
Fig. 7.
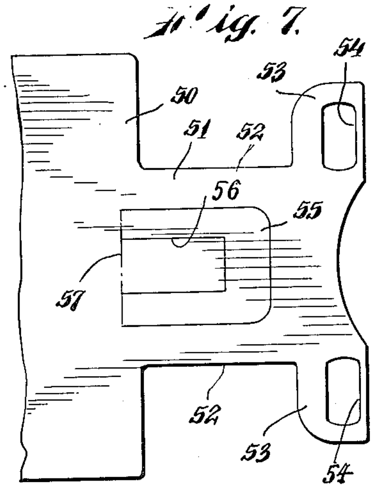
Fig. 8.
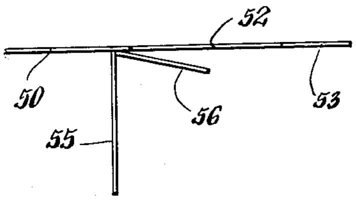
Fig. 9.
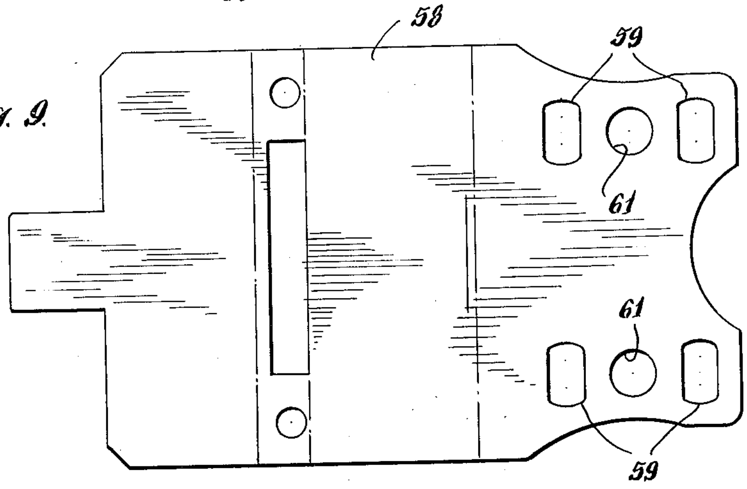
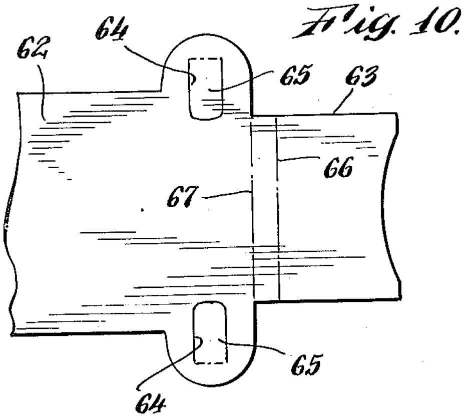
Fig. 11
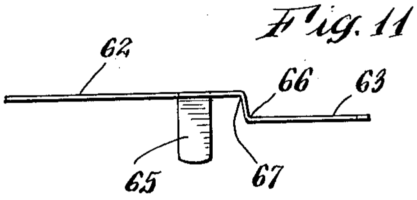
INVENTOR.
Murray J. Marrits.
BY
Fraser, Myers & Manley
ATTORNEYS.

UNITED STATES PATENT OFFICE 2,626,479

TELEPHONE DESK SECRETARY

Murray J. Marrits, New York, N. Y.

Application March 23, 1948, Serial No. 16,466

3 Claims. (Cl. 45—.5)

My present invention relates to what I term a desk secretary for table telephone instruments. By desk secretary I mean a device which may be readily attached to a telephone instrument for holding a pencil, paper pad, and provide a compartment for slips of paper containing messages and thereby serve to make always available to the telephone user paraphernalia necessary to make notes of calls or other information.

Among the objects of my invention are to provide a device of the character described, which may be attached to the conventional cradle or French type table or desk telephone instrument and be frictionally held thereon; which will not interfere with the operation and use of the telephone; which may be cheaply made from cardboard, plastic or the like; which can be made from a marked or scored blank and provide a cut-out for an assembly article for children and grown ups; which may be formed from a panel of a cracker or cereal carton or the like and thus serve as an advertising and selling aid for the product contained in said carton; or which may be molded from plastic where a more sturdy or finished article is desired.

In its underlying concept the device consists of a receptacle having one or more tabs formed of a size so that certain edges thereof provide frictional holding engagement with spaced surfaces on the base unit of the telephone instrument, for example, with the ears or horns of the instrument which provides a cradle for the removable combined receiver and transmitter, or with the shoulders provided between the opposite pairs of horns, or with the walls of the instrument or with any combination of said parts of the instrument. When made of relatively thin cardboard the device may be provided with one or more tongues to bear upon certain parts of the base unit of the instrument to give greater stability to the device. The invention will be better understood from the detailed description which follows, when considered in connection with the accompanying drawings showing several embodiments, and wherein:

Fig. 7 is a development or plan view of a part of a blank or cut-out from which still another embodiment of my invention may be made.

Fig. 8 is a side elevational view of the device formed from the blank shown in Fig. 7.

Fig. 9 is a development or plan view of still another embodiment of my invention.

Fig. 10 is a development or plan view of still another embodiment of my invention.

Fig. 11 is a side elevational view of the device formed from the blank shown in Fig. 10.

Figures 1, 2, 3, 4, 5, 6:
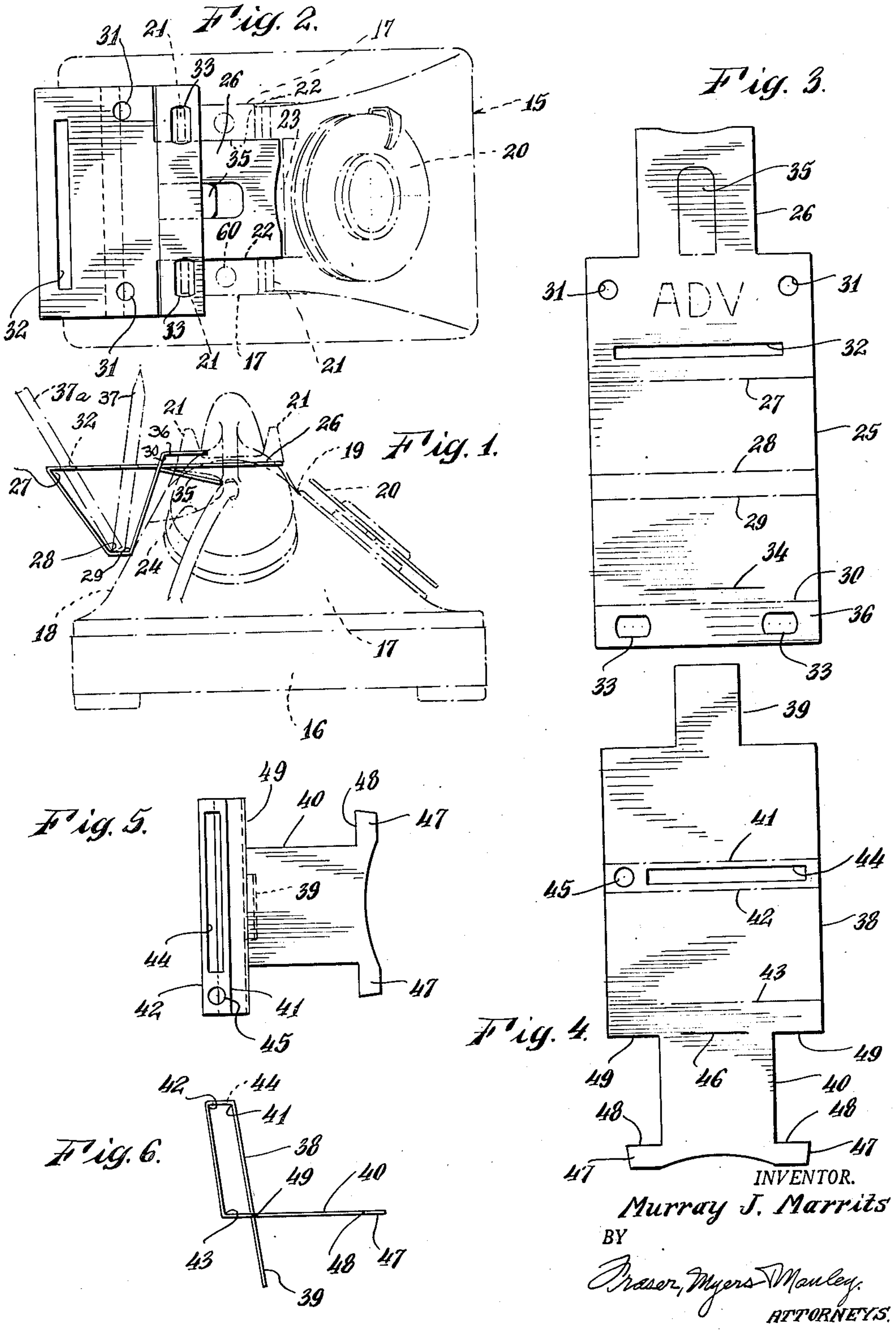
Figure 1 is a side elevational view of a conventional present-day table or desk type of telephone instrument having my invention applied thereto.
Fig. 2 is a top plan view of Fig. 1 with the combined mouthpiece and receiver of the telephone instrument omitted.
Fig. 3 is a development or plan view of a blank or cut-out from which the device of the present invention shown in Figs. 1 and 2 may be formed.
Fig. 4 is a view similar to Fig. 3 for making a modified form of my invention.
Fig. 5 is a top plan view of a device formed from the cut-out blank of Fig. 4.
Fig. 6 is a side elevational view of the device shown in Fig. 5.

Referring first to Figs. 1 to 3 of the drawings, the so-called desk secretary of my invention is designed and intended for use on a table or desk type telephone instrument 15 consisting of a base unit 16 of generally rectangular shape in plan view and having substantially parallel side walls 17, a downwardly sloping rear wall 18, a downwardly sloping front wall 19 upon which an indexing dial 20 may be mounted and pairs of ears or horns 21 extending upwardly from the side walls 17, the pairs of ears being spaced apart by inner parallel walls 22 providing a channel 23 therebetween. Below the base of the channel 23 and extending inwardly from the rear wall 18 is a recess 24. The base unit 16 of the telephone is of a type in general use at the present time and the present invention is not directed to said base unit per se.

Adapted for mounting and frictional holding engagement on the base unit of the telephone is the so-called desk secretary, which, as shown in Figs. 1 to 3, may be formed from a flat blank 25 formed of any suitable relatively stiff sheet material, the said blank being of generally rectangular form and having at one end thereof a rectangular tab or tongue 26. The blank 25 may be suitably scored along the lines 27, 28, 29 and 30 for assisting in bending or folding the blank and with cut-out openings 31 for accommodating pencils or the like in the device when assembled, a longitudinal cut-out opening or recess 32 for accommodating a memorandum pad or the like, and spaced cut-out openings or recesses 33 of a size such that the edges defining said recesses will be adapted to fit over an aligned pair of horns 21 to frictionally engage the same and hold the device in position on the base unit of the telephone. The blank 25 is also provided with a slit 34 of a length to accommodate and permit the tongue 26 to be inserted therethrough, for a purpose which will presently appear. If desired, the tongue 26 may be formed with a secondary tongue 35 which may be struck from the body of the tongue 26 and bent out of the plane thereof, for a purpose which will presently appear.

A blank such as 25 may be folded along the score lines 27, 28, 29 and 30 and the tongue 26 inserted through the slit 34 to provide a receptacle, the form of which, in side elevation, can best be ascertained from Fig. 2. In this connection it will be noted that the flap 36 formed by bending the blank along the score line 30 is bent along the opposite face of the blank from the folds along the score lines 27, 28 and 29. The device produced by folding and assembling the blank above described may be applied and held onto the base unit of the telephone instrument by positioning the recesses 33 over an aligned pair of horns 21, positioning the flap 26 between and in contact with the inner side walls 22 and inserting the secondary flap 35 into the recess 24. When the device is positioned on the base unit of the telephone in the manner set forth, the walls defining the recesses 33 will frictionally engage the walls of the ears 21 to hold the device upon the instrument. The frictional engagement between the side edges of the flap 26 and the inner walls 22 will serve to supplement the holding engagement of the device on the instrument provided by the recesses 33. When so positioned, one wall of the receptacle, namely, that provided between the score lines 29 and 30, will rest against the rear wall 18 of the instrument and thereby provide additional stability for the receptacle when mounted in position on the instrument. The receptacle when so mounted will have in its top wall the openings 21, which may be used to accommodate a pencil or other writing instrument 37, and the longitudinal recess 32 which may be used to accommodate and hold a memorandum pad 37*a*. The top wall may also serve to carry advertising matter, a calendar or the like. It will be noted that the receptacle is opened at its opposite ends and such opening may be availed of for the insertion of notes or memoranda made by the telephone user.

In the embodiment of my invention shown in Figs. 4, 5 and 6, the receptacle is formed from a blank 38 of generally rectangular form having projecting from one end thereof a tongue or tab 39, and from the other end thereof a tongue, tab or projection 40. Intermediate its length the blank is scored as at 41, 42 and 43, and provided between the score lines 41 and 42 with a longitudinal opening 44 and a circular opening 45 for accommodating a pad and a pencil, respectively when the blank is assembled into a receptacle. The blank is also formed with a slit 46 through which the tongue 39 is adapted to project. The tongue or projection 40 at its outer end is formed with a pair of lateral projections 47 having shoulders 48 which, in cooperation with shoulders 49 at the end of the blank proper 38, are adapted to engage over the outer or most distantly spaced apart walls of the ears 21 of the base unit when the blank is assembled into the form of a receptacle and mounted on the base unit of the telephone.

In assembling the device shown in Figs. 4, 5 and 6, the blank is folded inwardly along the score lines 41, 42 and 43, and the tongue 39 inserted through the slit 46 to provide a device as shown in plan and side elevation, respectively, in Figs.

5 and 6. In mounting said device on the base unit of a telephone the shoulders 48 and 49 each frictionally engage over the outer or most distantly spaced apart walls of the ears 21, the longitudinal edges of the flap 40 frictionally engage with the inner side walls 22, and the tongue 39 will bear against the rear wall 18 to hold and support the assembled receptacle in place on the telephone instrument. The device when so assembled and mounted will have the recesses 44 and 45 located at the top of the receptacle for accommodating respectively a pad and pencil, and the end walls of the receptacle will be open for accommodating slips of paper containing memoranda.

In Figs. 7 and 8 of the drawings there is disclosed a further embodiment of my invention according to which the device is formed from a blank 50, the receptacle forming portion of which has been omitted in view of the fact that it may be substantially the same as that shown in either of the preceding modifications. For holding the receptacle on a telephone base unit the blank is formed with a tongue 51 the lateral walls 52 of which are adapted to frictionally engage between the inner walls 22 of the base unit and the tongue 51 has lateral projections 53 each formed with a cut-out recess 54 of a size to frictionally engage over an ear or horn of the instrument. The tongue 51 is formed with cut-out supplemental tongues 55 and 56 foldable along the score line 57 for engaging respectively the rear wall 18 and the recess 24 within the base unit of the instrument.

The blank 58 shown in Fig. 9 of the drawings is of a form to provide a receptacle such as shown in Figs. 5 and 6 but the means for holding said receptacle on the telephone base unit are somewhat different. According to this embodiment of the invention the folded and assembled device is adapted to be held onto the base unit of a telephone by the frictional engagement provided by the walls of the cut-out recesses 59 over the four upstanding ears 21 of the base unit. However, in order to provide clearance and freedom of movement of the contact plungers 60 of the base unit, said blank is formed with circular recesses 61. The construction and assembly of this embodiment, it is thought, will be apparent in view of the detailed descriptions of the previously described embodiments.

In the embodiment of my invention shown in Figs. 10 and 11 the blank 62 is formed with a tongue 63 of a width to frictionally engage between the walls 22 of the base unit and with cut-out recesses 64 to frictionally engage over aligned ears 21. Instead of completely cutting out the material from the blank to provide the recesses 64, the blank is cut along three sides of the recesses and the material of the blank is bent downwardly, as best shown in Fig. 11, to provide flaps 65 which will frictionally engage the side walls 17 of the instrument below the ears. It will be apparent that the embodiments of my invention shown in Figs. 1 to 3, and 7 to 10 can be provided with flaps similar to those numbered 65 in Figs. 10 and 11. As the bases of the ears of the instrument are disposed slightly above the top wall of the channel 23 the blank is scored along the lines 66 and 67 and bent in opposite directions, as best shown in Fig. 11. In this embodiment, like that shown in Figs. 7 and 8, the receptacle portion of the blank has been omitted but it will be apparent that it may be of the same general construction as that shown in the previously described figures or of any other arbitrary form well known in carton manufacture. It will likewise be apparent from the preceding description as to the manner in which the device of Figs. 10 and 11 may be frictionally held on a telephone base unit.

While I have shown and described a number of embodiments of my invention, it is to be understood that these are merely exemplary of the concept underlying the present invention and that modifications in the specific details of construction thereof may be resorted to without departing from the spirit of the invention as defined in the appended claims.

What I claim is:

1. A memoranda paraphernalia holding device adapted to be attached to the base unit of a cradle type telephone instrument, comprising a blank of relatively stiff, deformable sheet material having folded and cut-out parts, the folded parts providing an open-ended receptacle for the memoranda paraphernalia and cut-out parts providing an extension tab at one end of the blank and substantially rectangular openings at the other end of the blank adapted to engage over a pair of upstanding ears on the base unit of a cradle type telephone instrument, and the edges of said openings being adapted to frictionally engage said ears to hold the device on said base unit, and the edges of the tab being adapted to frictionally engage the side walls of the base unit between the ears to supplement the holding engagement of the device on the base unit.

2. A device according to claim 1 wherein the top has a supplemental tab struck up therefrom and disposed at an angle thereto and adapted to bear against the under side of the top of the base unit disposed between the upstanding ears.

3. A memoranda paraphernalia holding device adapted to be attached to the base unit of a cradle type telephone instrument, comprising a blank of relatively stiff, deformable sheet material having folded, slitted and cut-out parts, the folded parts providing an open-ended receptacle for the memoranda paraphernalia, cut-out parts providing an extension tab at one end of the blank and substantially rectangular openings at the other end of the blank, the tab engaging in and projecting through the slit in the blank to hold the device in folded relation, the rectangular openings adapted to engage over a pair of upstanding ears on the base unit of a cradle type telephone instrument and the edges of said openings being adapted to frictionally engage said ears to hold the device on said base unit.

MURRAY J. MARRITS.

REFERENCES CITED

The following references are of record in the file of this patent:

UNITED STATES PATENTS

| Number | Name | Date |
|---|---|---|
| 1,051,611 | McGough | Jan. 28, 1913 |
| 1,983,443 | Duceska | Dec. 4, 1934 |
| 2,068,271 | Huott | Jan. 19, 1937 |
| 2,271,140 | Kelley | Jan. 27, 1942 |
| 2,320,838 | Watson | June 1, 1943 |
| 2,488,516 | Shore | Nov. 15, 1949 |
| 2,500,838 | Levine | Mar. 14, 1950 |